(12) United States Patent
Chen

(10) Patent No.: US 12,712,187 B2
(45) Date of Patent: Aug. 18, 2026

(54) SECONDARY BATTERY AND ELECTRONIC DEVICE

(71) Applicant: Ningde Amperex Technology Limited, Ningde (CN)

(72) Inventor: Meifeng Chen, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 625 days.

(21) Appl. No.: 18/193,117

(22) Filed: Mar. 30, 2023

(65) Prior Publication Data

US 2023/0282835 A1 Sep. 7, 2023

Related U.S. Application Data

(63) Continuation of application No. PCT/CN2023/074533, filed on Feb. 6, 2023.

(30) Foreign Application Priority Data

Mar. 7, 2022 (CN) ......................... 202210213883.9

(51) Int. Cl.
*H01M 4/62* (2006.01)
*H01M 4/02* (2006.01)

(52) U.S. Cl.
CPC ...... *H01M 4/625* (2013.01); *H01M 2004/021* (2013.01); *H01M 2004/028* (2013.01)

(58) Field of Classification Search
CPC ........... H01M 4/635; H01M 2004/021; H01M 2004/028; H01M 4/625
See application file for complete search history.

(56) References Cited

U.S. PATENT DOCUMENTS

2009/0181309 A1 7/2009 Kwon et al.
2018/0248195 A1 8/2018 Choi et al.
2021/0047185 A1 2/2021 Finlayson et al.
(Continued)

FOREIGN PATENT DOCUMENTS

CN 101488567 A 7/2009
CN 103474619 A 12/2013
(Continued)

OTHER PUBLICATIONS

JP 2018533175 A, Machine Translation (Year: 2018).*
(Continued)

*Primary Examiner* — Devina Pillay
(74) *Attorney, Agent, or Firm* — Maier & Maier, PLLC

(57) ABSTRACT

A secondary battery includes a positive electrode plate. The positive electrode plate includes a current collector and a positive active material layer. The positive active material layer includes a positive active material and a carbon material. The carbon material includes carbon nanotube bundles with a ratio of an average length of the carbon nanotube bundles to an average diameter of the carbon nanotube bundles being in a range of 2.5 to 100. The carbon nanotube bundle includes a plurality of first carbon nanotubes. The carbon nanotube bundles reduce an initial direct-current resistance of the battery, ensure integrity of a conductive network during cycling, effectively reduce the growth of the direct current resistance, and increase the charging speed.

18 Claims, 2 Drawing Sheets

(56) References Cited

U.S. PATENT DOCUMENTS

| | | | | |
|---|---|---|---|---|
| 2021/0313559 | A1* | 10/2021 | Zettsu | H01M 4/625 |
| 2021/0408519 | A1 | 12/2021 | Oh | |
| 2022/0216480 | A1* | 7/2022 | Kim | H01M 4/525 |

FOREIGN PATENT DOCUMENTS

| | | | | |
|---|---|---|---|---|
| CN | 107925056 | A | 4/2018 | |
| CN | 111146421 | A | 5/2020 | |
| CN | 112203977 | A | 1/2021 | |
| CN | 113380978 | A | 9/2021 | |
| CN | 113785422 | A | 12/2021 | |
| CN | 114300686 | A | 4/2022 | |
| EP | 3748759 | A1 | 12/2020 | |
| EP | 3951932 | A1 | 2/2022 | |
| JP | 2009190948 | A | 8/2009 | |
| JP | 2015053165 | A | 3/2015 | |
| JP | 2016048698 | A | 4/2016 | |
| JP | 2018533175 | A | * 11/2018 | H01B 1/24 |
| JP | 2021007109 | A | 1/2021 | |
| JP | 2021533551 | A | 12/2021 | |
| KR | 1020210040804 | A | 4/2021 | |
| WO | 2013047832 | A1 | 4/2013 | |
| WO | 2021007183 | A1 | 1/2021 | |

OTHER PUBLICATIONS

Search Report issued on May 18, 2023, in corresponding International Application No. PCT/CN2023/074533, 6 pages.

Extended Search Report issued on Feb. 14, 2025, in corresponding European Application No. 23712139.7, 9 pages.

Office Action issued on May 15, 2024, in corresponding Canadian Application No. 3,194,450, 5 pages.

Notice of Allowance issued on May 21, 2024, in corresponding Japanese Application No. 2023-519293, 6 pages.

Office Action issued on Apr. 15, 2022, in corresponding Chinese Application No. 202210213883.9, 15 pages.

Notification of Grant issued on May 8, 2022, in corresponding Chinese Application No. 202210213883.9, 4 pages.

Office Action issued on Dec. 4, 2025, in corresponding Korean Application No. 10-2024-7031356, 14 pages.

* cited by examiner

SECONDARY BATTERY AND ELECTRONIC DEVICE

CROSS REFERENCE TO THE RELATED APPLICATIONS

This application is a continuation application of International Application No. PCT/CN2023/074533, filed on Feb. 6, 2023, which claims priority to Chinese Patent Application No. 2022102138839, filed on Mar. 7, 2022, the contents of which are incorporated herein by reference in its entirety.

TECHNICAL FIELD

This application relates to the technical field of batteries, and in particular, to a secondary battery and an electronic device.

BACKGROUND

A positive electrode plate of a secondary battery keeps expanding and shrinking during charge-and-discharge cycles of the secondary battery in use, thereby disrupting a part of a conductive network of the battery and leading to growth of a direct current resistance (DCR) of the battery. The DCR growth of the battery leads to deterioration of the rate performance and charging performance and rapid life fading of the battery. Therefore, efforts still need to be made to significantly suppress the DCR growth.

SUMMARY

This application provides a secondary battery, including a positive electrode plate. The positive electrode plate includes carbon nanotube bundles. The carbon nanotube bundle includes a plurality of first carbon nanotubes. The existence of carbon nanotube bundles not only reduce an initial DCR of the battery, but also ensure integrity of a conductive network during cycling, effectively reduce the DCR growth during cycling, improve the cycle life of the battery, and increase the charging speed.

A secondary battery disclosed herein includes a positive electrode plate. The positive electrode plate includes a current collector and a positive active material layer. The positive active material layer includes a positive active material and a carbon material. The carbon material includes carbon nanotube bundles with a length-to-diameter ratio of 2.5 to 100. The carbon nanotube bundle includes a plurality of first carbon nanotubes.

Optionally, the carbon nanotube bundle satisfies at least one of the following conditions:

(i) an average length of the carbon nanotube bundles is 2 μm to 10 μm; and (ii) an average tube diameter of the carbon nanotube bundles is 0.01 μm to 2 μm.

Optionally, the number of the carbon nanotube bundles within an area of 20 μm×20 μm is m, as measured in a scanning electron microscope test, and a value range of m is $2 \le m \le 30$.

Optionally, the first carbon nanotubes satisfy at least one of the following conditions:

(I) a diameter of each first carbon nanotube is in a value range of 5 nm to 40 nm; and (II) an average number of the first carbon nanotubes in each carbon nanotube bundle is n, and a value range of n is $50 \le n \le 10000$.

Optionally, the carbon material further includes second carbon nanotubes, and the second carbon nanotubes exist on a surface of a particle of the positive active material.

Optionally, the second carbon nanotubes exist on a surface of the carbon nanotube bundle.

Optionally, the second carbon nanotubes satisfy at least one of the following conditions:

(a) an average length of the second carbon nanotubes is 0.1 μm to 2 μm; and (b) an average diameter of the second carbon nanotubes is 3 nm to 40 nm.

Optionally, based on a total mass of the positive active material layer, a mass percent of the carbon nanotube bundles is 0.1% to 1%; and/or a mass percent of the second carbon nanotubes is 0.1% to 1%.

Optionally, based on a total mass of the positive active material layer, a mass percent of the carbon nanotube bundles is less than a mass percent of the second carbon nanotubes.

Optionally, a fully-charged-state film resistance of the positive electrode is R Ω, and the number of the carbon nanotube bundles within an area of 20 μm×20 μm is m, as measured in a scanning electron microscope test.

The fully-charged-state film resistance and the number of the carbon nanotube bundles satisfy Formula I:

$$R \times m \le 5. \quad \text{Formula I}$$

Optionally, $0 < R \le 0.5$.

Optionally, based on a total mass of the positive active material layer, a mass percent of the carbon material is 0.1% to 2%.

According to a second aspect of this application, this application further provides a method for preparing the positive electrode plate described above. The method includes:

Specifically, the method for preparing the positive electrode plate includes:

1) mixing a positive active material, a carbon material, a binder, and a solvent (such as deionized water or N-methyl-pyrrolidone) evenly to make a slurry;

2) coating a target region of a current collector aluminum foil with the slurry made in step 1);

3) drying the solvent to obtain an elementary electrode plate coated with a positive active material layer; and 4) drying, rolling, and slitting the elementary electrode plate obtained in step 3) to obtain a positive electrode plate (also referred to as a positive electrode).

The carbon material includes carbon nanotube bundles, or includes carbon nanotube bundles and second carbon nanotubes.

According to a third aspect of this application, this application further provides an electronic device. The electronic device includes any one of the secondary batteries disclosed above.

The technical solutions provided in this application bring at least the following beneficial effects:

(1) In this application, carbon nanotube bundles are included in the positive electrode plate. Each carbon nanotube bundle includes a plurality of first carbon nanotubes, thereby not only reducing an initial direct-current resistance (DCR) of the battery, but also ensuring integrity of a conductive network during cycling, effectively reducing the DCR growth during cycling, and increasing the charging speed. Specifically, during cycling of the battery, as the positive active material layer keeps expanding and shrinking, the conductive network in the positive active material layer is disrupted, the contact between particles of the positive active material becomes poor, the electron transport is impaired and the DCR increases. By adding carbon nanotube bundles, this application forms a firmer conductive network, ensures integrity of the conductive network during cycling and reduces DCR growth.

(2) Compared with a battery containing no carbon nanotube bundles or a battery in which the parameters of the carbon nanotube bundles and the second carbon nanotubes fail to satisfy the specified conditions, the cycle life of the battery containing the carbon nanotube bundles and the second carbon nanotubes has been improved and the direct-current resistance has been reduced.

(3) In this application, the addition of second carbon nanotubes into the carbon material achieves an effect of further improving the battery life.

(4) In this application, the product of the value of the fully-charged-state film resistance and the number of carbon nanotube bundles is less than or equal to 5, and the fully-charged-state film resistance value is less than or equal to 0.5Ω, thereby achieving an effect of improving the low-temperature performance of the battery.

BRIEF DESCRIPTION OF THE DRAWINGS

To describe the technical solutions in some embodiments of this application more clearly, the following outlines the drawings to be used in said embodiments. Evidently, the drawings outlined below are merely a part of embodiments of this application. A person of ordinary skill in the art may derive other drawings from the outlined drawings without making any creative efforts.

DETAILED DESCRIPTION

Figure 1:
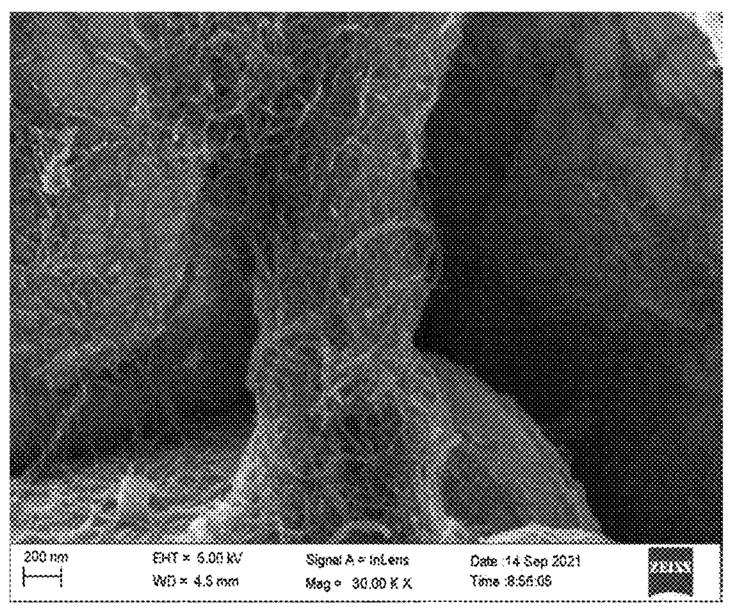
FIG. 1 is a scanning electron microscope (SEM) image of a positive electrode plate according to Embodiment 1-3 of this application.

In the prior art, DCR growth brings many adverse effects on a battery, such as deterioration of rate performance, shortened battery life, and long charging time. Therefore, the DCR growth of the battery usually needs to be suppressed by means of reducing the thickness of a positive electrode plate and increasing dosage of a conductive agent. However, these means usually lead to a significant loss of the energy density of the battery and even achieve an insignificant effect of suppressing the DCR growth.

This application provides a positive electrode plate. The positive electrode plate includes a current collector and a positive active material layer. The positive active material layer includes a positive active material and a carbon material. The carbon material includes carbon nanotube bundles with a length-to-diameter ratio greater than or equal to 2.5 but less than or equal to 100. The carbon nanotube bundle includes a plurality of first carbon nanotubes.

Specifically, the length-to-diameter ratio of the carbon nanotube bundles falls within a range formed by any two of 5, 7, 10, 12.5, 20, 25, 50, 80, or 100.

Optionally, the carbon material includes carbon nanotube bundles with a length-to-diameter ratio greater than or equal to 3 but less than or equal to 80.

Optionally, the carbon material includes carbon nanotube bundles with a length-to-diameter ratio greater than or equal to 3 but less than or equal to 70.

Optionally, the carbon material includes carbon nanotube bundles with a length-to-diameter ratio greater than or equal to 3 but less than or equal to 50.

Optionally, the carbon material includes carbon nanotube bundles with a length-to-diameter ratio greater than or equal to 3 but less than or equal to 40.

The length-to-diameter ratio is a ratio of an average length of the carbon nanotube bundle to an average tube diameter.

In some embodiments of this application, a plurality of first carbon nanotubes form a carbon nanotube bundle, thereby increasing the length-to-diameter ratio of the carbon nanotube bundles, and effectively improving the electrical conductivity of the positive electrode plate. In addition, the bundles can be dispersed easily, thereby ensuring uniformity of dispersion of a positive slurry. The bundled carbon nanotubes are less prone to disruption than the commonly used individual carbon nanotubes.

Optionally, the positive active material includes lithium cobalt oxide, lithium nickel cobalt manganese oxide, lithium nickel cobalt manganese aluminum oxide, lithium iron phosphate, and lithium manganese oxide.

Optionally, an average length of the carbon nanotube bundles is 2 μm to 10 μm.

Specifically, the average length of the carbon nanotube bundles falls within a range formed by any two of 2 μm, 5 μm, 8 μm, or 10 μm.

Optionally, an average tube diameter of the carbon nanotube bundles is 0.01 μm to 2 μm.

Specifically, the average tube diameter of the carbon nanotube bundles falls within a range formed by any two of 0.01 μm, 0.05 μm, 0.1 μm, 0.2 μm, 0.4 μm, 0.5 μm, 0.7 μm, 1 μm, or 2 μm.

Optionally, the average tube diameter of the carbon nanotube bundles is 0.01 μm to 1.8 μm.

Optionally, the average tube diameter of the carbon nanotube bundles is 0.01 μm to 1.5 μm.

Optionally, the average tube diameter of the carbon nanotube bundles is 0.05 μm to 1.2 μm.

Specifically, the average length is measured by using a scanning electron microscope according to the following method: measuring the length of the carbon nanotube bundles in an area of 20 μm×20 μm, and averaging out the lengths of all carbon nanotube bundles in the area to obtain an average length.

The average tube diameter is measured by using a scanning electron microscope according to the following method: measuring the tube diameter of the carbon nanotube bundles in an area of 20 μm×20 μm, measuring the width of each carbon nanotube bundle for 1 time at 3 different positions on the bundle, and denoting the measured value as the tube diameter of the carbon nanotube bundle, and averaging out the tube diameters of all carbon nanotube bundles in the area to obtain an average tube diameter.

In this application, the average length, average tube diameter, and length-to-diameter ratio are set to fall within the foregoing ranges, thereby achieving superior overall performance such as a low DCR, good rate performance, good low-temperature performance, and long cycle life.

Optionally, the number of the carbon nanotube bundles within an area of 20 μm×20 μm is m, as measured in a scanning electron microscope test, and a value range of m is $2 \le m \le 30$.

In this application, excessive carbon nanotube bundles fully wrap the surface of the positive active material, thereby impairing ion conductivity. Deficient carbon nanotube bundles lead to an incomplete conductive network. Therefore, the number of the carbon nanotube bundles is set to fall within an appropriate range to ensure both integrity of the conductive network and high efficiency of ion transport.

Optionally, the diameter of the first carbon nanotube is 5 nm to 40 nm.

The diameter of the first carbon nanotube falls within a range formed by any two of 5 nm, 15 nm, 20 nm, 30 nm, 40 nm, or 50 nm.

Optionally, the average number of the first carbon nanotubes in each carbon nanotube bundle is n, and the value range of n is $50 \le n \le 10000$. In this application, an SEM image is selected in which a cross-section of the carbon nanotube bundle is shown. The number of the first carbon nanotubes on the cross-section of a carbon nanotube bundle is determined. The numbers of the first carbon nanotubes in 5 carbon nanotube bundles are counted and averaged out. The average value is rounded off to obtain the average number of the first carbon nanotubes.

In this application, the diameter of the first carbon nanotube falls within the range of 5 nm to 40 nm. If the diameter of the first carbon nanotube is too small, the first carbon nanotubes can be hardly dispersed. If the diameter of the first carbon nanotube is too large, the first carbon nanotubes are prone to be disrupted during dispersion, and can hardly maintain a high length-to-diameter ratio. In this application, the testing method of the diameter of the first carbon nanotube is the same as the testing method of the average number of the first carbon nanotubes except that the measurement data is the diameter of the first carbon nanotube.

The number of the first carbon nanotubes in a carbon nanotube bundle falls within the foregoing range, so that the tube diameter, the diameter, and the conductivity of the carbon nanotube bundle fall within an appropriate range, thereby preventing excessive wrapping of the positive active material by the carbon nanotube bundle, reducing the impact on ion transport, and making the carbon nanotube bundles less prone to disruption during cycling.

Optionally, the carbon material further includes second carbon nanotubes. The second carbon nanotubes are attached onto the surface of the positive active material and the surface of the carbon nanotube bundle.

The second carbon nanotubes in this application are individual carbon nanotubes.

In this application, the carbon nanotube bundle provides a main electronic channel. Electrons can be quickly transported inside a bundle and between the bundle and the positive active material. By connecting the bundle and the active material, the second carbon nanotubes enable quick transport of the electrons to different positions in the active material. The coordination between the two materials achieves the effects of reducing the DCR and improving the cycle life of the battery.

Optionally, the average length of the second carbon nanotubes is 0.1 μm to 2 μm.

The average length of the second carbon nanotubes falls within a range formed by any two of 0.2 μm, 0.4 μm, 0.8 μm, 1.5 μm, or 2 μm.

Optionally, the average diameter of the second carbon nanotubes is 3 nm to 40 nm.

Optionally, the average diameter of the second carbon nanotubes falls within a range formed by any two of 3 nm, 5 nm, 10 nm, 18 nm, or 25 nm.

In this patent, the average length and average diameter of the second carbon nanotubes are set to fall within appropriate ranges to improve the cycle life of the battery.

Optionally, a fully-charged-state film resistance of the positive electrode is R Ω, and the number of the carbon nanotube bundles within an area of 20 μm×20 μm is m. The fully-charged-state film resistance and the number of carbon nanotube bundles satisfy Formula I and/or Formula II:

$$R \times m \le 5; \text{ and} \quad \text{Formula I}$$

$$0 < R \le 0.5. \quad \text{Formula II}$$

Preferably, the fully-charged-state film resistance and the number of the carbon nanotube bundles satisfy Formula I-1 and Formula II-1:

$$0.5 \le R \times m \le 1.5; \text{ and} \quad \text{Formula I-1}$$

$$0.05 \le R \le 0.3. \quad \text{Formula II-1}$$

The method for preparing the positive electrode includes:

Specifically, the method for preparing the positive electrode plate includes:

1) mixing a positive active material, a carbon material, a binder, and a solvent (such as deionized water or N-methyl-pyrrolidone) evenly to make a slurry;
2) coating a target region of a current collector with the slurry made in step 1);
3) drying the solvent to obtain an elementary electrode plate coated with a positive active material layer; and
4) drying and rolling the elementary electrode plate obtained in step 3) to obtain a positive electrode plate.

Specifically, the carbon material may be a conductive agent made by mixing the carbon nanotube bundle with at least one of conductive carbon black or the second carbon nanotubes.

Optionally, the positive active material layer includes a positive active material, the carbon nanotube bundles, the second carbon nanotubes, and a binder.

Optionally, the positive active material layer includes a positive active material, the carbon nanotube bundles, the second carbon nanotubes, an Super-P conductive agent, and a binder, between which a mass ratio is (96 to 98):(0.1 to 0.8):(0.2 to 1.0):(0.5 to 1.0):(1.0 to 2.0).

The following describes detailed embodiments:

The parameters of the carbon nanotube bundles in each example are shown in Table a. The carbon nanotube bundles are commercially available, and may be any carbon nanotube bundles as long as the parameter ranges of the carbon nanotube bundles specified in this application are satisfied.

TABLE a

Parameters of carbon nanotube bundles

| | Serial number | Average tube diameter (μm) | Average length (μm) | Length-to-diameter ratio | Diameter of first carbon nanotube (nm) | Average number of first carbon nanotubes |
|---|---|---|---|---|---|---|
| Carbon nanotube bundle | 1# | 0.4 | 5 | 12.5 | 20 | 400 |
| | 2# | 0.2 | 5 | 25 | 20 | 150 |
| | 3# | 0.1 | 5 | 50 | 20 | 110 |
| | 4# | 0.05 | 5 | 100 | 20 | 50 |
| | 5# | 1 | 5 | 5 | 20 | 2500 |
| | 6# | 2 | 5 | 2.5 | 20 | 10000 |

TABLE a-continued

| Parameters of carbon nanotube bundles | | | | | |
|---|---|---|---|---|---|
| Serial number | Average tube diameter (μm) | Average length (μm) | Length-to-diameter ratio | Diameter of first carbon nanotube (nm) | Average number of first carbon nanotubes |
| 7# | 0.1 | 2 | 20 | 20 | 110 |
| 8# | 0.1 | 8 | 80 | 20 | 110 |
| 9# | 0.1 | 10 | 100 | 20 | 110 |
| 10# | 0.5 | 5 | 10 | 5 | 10000 |
| 11# | 0.5 | 5 | 10 | 15 | 1100 |
| 12# | 0.5 | 5 | 10 | 30 | 280 |
| 13# | 0.5 | 5 | 10 | 40 | 150 |
| 14# | 0.5 | 5 | 10 | 20 | 50 |
| 15# | 0.7 | 5 | 7.1 | 20 | 110 |
| D1 | 1 | 2 | 2 | 20 | 2500 |
| D2 | 0.08 | 8 | 103 | 20 | 280 |

The parameters of the second carbon nanotubes in each example are shown in Table b. The second carbon nanotubes are commercially available, and may be any carbon nanotubes as long as the parameter ranges of the second carbon nanotubes specified in this application are satisfied.

TABLE b

| Parameters of second carbon nanotubes | | | |
|---|---|---|---|
| | Serial number | Average length (μm) | Average tube diameter (nm) |
| Second carbon nanotube | 1# | 0.4 | 5 |
| | 2# | 0.8 | 5 |
| | 3# | 1.5 | 5 |
| | 4# | 2 | 5 |
| | 5# | 0.1 | 5 |
| | 6# | 0.4 | 3 |
| | 7# | 0.4 | 10 |
| | 8# | 0.4 | 18 |
| | 9# | 0.4 | 25 |
| | 10# | 0.4 | 40 |

Embodiment 1-1

S100. Mix $LiCoO_2$, 1 #carbon nanotube bundles, and PVDF at a mass ratio of 98.2:0.5:1.3 to make a slurry.

S200. Coat a target region of a current collector (aluminum foil) with the slurry.

S300. Dry the slurry at 120° C. to obtain an elementary electrode plate coated with an active material layer.

S400. Dry and roll the elementary electrode plate obtained in step S300 to obtain a positive electrode plate.

Embodiment 1-2

The preparation method of the positive electrode plate is identical to that in Embodiment 1-1 except that the mass percent of the 1 #carbon nanotube bundles is 0.3%.

Embodiment 1-3

Preparing the 1 #positive electrode plate:

S100. Mix $LiCoO_2$, 1 #carbon nanotube bundles, and 1 #second carbon nanotubes, and PVDF at a specified ratio to make a slurry.

S200. Coat a target region of a current collector (aluminum foil) with the slurry.

S300. Dry the slurry at 120° C. to obtain an electrode plate coated with an active material layer.

S400. Dry and roll the electrode plate obtained in step S300 to obtain a positive electrode plate, denoted as 1 #positive electrode plate.

In Embodiment 1-3, the mass percent of the PVDF in the positive active material layer is 1.3%, the mass percent of the carbon nanotube bundles and the second carbon nanotubes is shown in Table 1, and the remaining ingredient is the positive active material.

Embodiment 1-4 to Embodiment 1-28

The preparation method of the positive electrode plate is similar to that in Embodiment 1-3 except the parameter values shown in Table 1.

Embodiment 1-4 to Embodiment 1-17 differ from Embodiment 1-1 in that a different carbon nanotube bundle is used.

A main difference in Embodiment 1-18 to Embodiment 1-23 is that the number m of carbon nanotube bundles in an area of 20 μm×20 μm is adjusted.

A main difference in Embodiment 1-24 to Embodiment 1-26 is that the mass percent of the carbon nanotube bundles is adjusted.

The parameters adjusted in Embodiment 1-27 and Embodiment 1-28 are shown in Table 1.

Embodiment 2-1 to Embodiment 2-12

The preparation method of the positive electrode plate is similar to that in Embodiment 1-3 except the parameter values shown in Table 2.

Embodiment 2-1 to Embodiment 2-10 differ from Embodiment 1-1 primarily in that different second carbon nanotubes are used and the mass percent of the second carbon nanotubes is different.

Comparative Embodiment 1

The preparation method of the positive electrode plate is similar to that in Embodiment 1-2 except that no carbon nanotube bundles are added. For details, see the data in Table 3.

Comparative Embodiment 2

The preparation method of the positive electrode plate is similar to that in Embodiment 1-3 except that the carbon nanotube bundles are different and no second carbon nanotubes are added. For details, see the data in Table 3.

Comparative Embodiment 3

The preparation method of the positive electrode plate is similar to that in Embodiment 1-3 except that the type of the carbon nanotube bundles is adjusted. For details, see the data in Table 3.

Comparative Embodiment 4

The preparation method of the positive electrode plate is similar to that in Embodiment 1-3 except that the type of the carbon nanotube bundles is adjusted. For details, see the data in Table 3.

Structural Characteristics of Carbon Material in Positive Electrode Plate

An SEM test is carried out for positive electrode plate samples prepared in some embodiments and comparative embodiments respectively.

The 1 #positive electrode plate in Embodiment 1-3 is used as a typical representative, and FIG. 1 shows an SEM image (a) of the positive electrode plate. As can be seen from the drawing, a carbon nanotube bundle is formed from 400 first carbon nanotubes, and the diameter of the first carbon nanotube is 20 nm.

Figure 2:
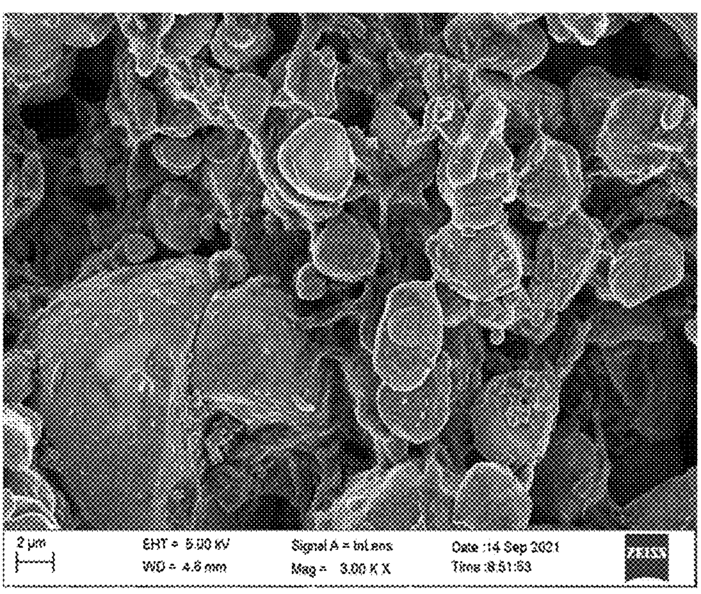
FIG. 2 is an SEM image of the carbon nanotube bundles according to Embodiment 1-3 of this application.

FIG. 2 shows an SEM image (b) of the carbon nanotube bundles in the 1 #positive electrode plate. In an area of 20 μm×20 μm, there are 6 carbon nanotube bundles. The average length of the carbon nanotube bundles is 5 μm, the average tube diameter is 0.4 μm, and the length-to-diameter ratio is 12.5.

Figure 3:
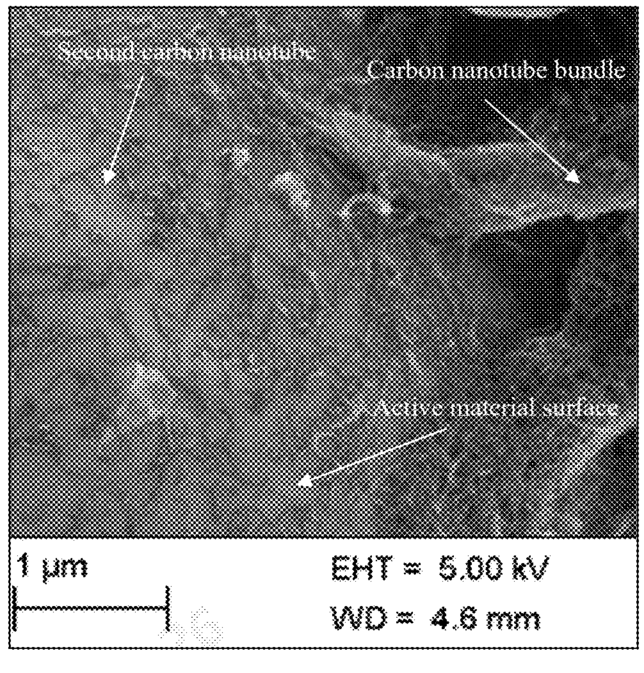
FIG. 3 is an SEM image of the second carbon nanotubes according to Embodiment 1-3 of this application.

FIG. 3 is an SEM image (c) of the second carbon nanotubes in the 1 #positive electrode plate. As can be seen from this drawing, the average length of the second carbon nanotubes is 0.4 am, and the average diameter of the second carbon nanotubes is 5 nm. The second carbon nanotubes are attached onto the surface of the positive active material and the surface of the carbon nanotube bundle.

Battery Preparation

Stack a positive electrode, a separator, and a negative electrode in sequence so that the separator is located between the positive electrode and the negative electrode to serve a purpose of isolation. Wind the stacked structure to obtain an electrode assembly. Put the electrode assembly into an outer package, and inject the prepared electrolyte. Seal the package and perform steps such as chemical formation, degassing, and edge trimming to obtain a battery.

Fully-Charged-State Film Resistance Test

Test Method:

1) Charge a lithium-ion battery at a constant current of 0.05 C rate until the voltage reaches 4.4 V, and then charge the battery at a constant voltage until the current reaches a cut-off current of 0.025 C so that the lithium-ion battery reaches a fully charged state.
2) Disassemble the lithium-ion battery to obtain a positive electrode plate.
3) Place the positive electrode plate obtained in step 2) in an environment with a humidity of 5% to 15% to stand for 30 minutes, and then seal the positive electrode plate and relocate it to a resistance test site.
4) Use a BER1200 film resistance tester to test the resistance of the positive electrode plate obtained in step 3). Space out adjacent test points at intervals of 2 mm to 3 mm. Choose 15 different points at least for testing. The average resistance value of all test points is recorded as a fully-charged-state wet film resistance of the positive electrode plate. The test parameters are listed as follows: the area of a press head is 153.94 $mm^2$, the pressure is 3.5 t, and the holding time is 50 s.

The test results are shown in Table 1, Table 2, and Table 3.

Cycle Performance Test

Charge a lithium-ion battery at a current of 0.5 C in a (25±3) ° C. environment until the voltage reaches 4.4 V, and then charge the battery at a constant voltage until the current reaches to 0.05 C. Subsequently, discharge the battery at a current of 1 C until the voltage reaches 3.0 V, thereby completing a cycle. Repeat the foregoing steps until the end of 500 cycles, and then determine a ratio of the remaining capacity of the battery to the initial capacity, that is, a capacity retention rate.

The test results are shown in Table 1, Table 2, and Table 3.

Initial DCR and 500$^{th}$-Cycle DCR Tests

Test Method:

Charge a lithium-ion battery at a current of 0.5 C in a (25±3) ° C. environment until the voltage reaches 4.4 V, and then charge the battery at a constant voltage until the current reaches to 0.05 C. Subsequently, discharge the battery at a current of 0.1 C for 2 hours, and then leave the battery to stand for 1 hour. Afterward, discharge the battery at a current of 0.1 C ($I_1$) for 10 seconds, and record a discharge voltage $V_1$ at the last second. Discharge the battery at a current of 1 C ($I_2$) for 1 second, and record the discharge voltage $V_2$ at the last second. Calculate the DCR according to: DCR=$(V_1-V_2)/(I_2-I_1)$.

Charging Speed Test

Test method: Charge a lithium-ion battery at a current of 3 C in a (25±3) ° C. environment until the voltage reaches 4.4 V, and then charge the battery at a constant voltage until the current reaches to 0.4 C. Record the charging time.

The test results are shown in Table 1, Table 2, and Table 3.

Rate Performance Test

Charge a battery at a current of 0.5 C in a (25±3) ° C. environment until the voltage reaches 4.4 V, and then charge the battery at a constant voltage of 4.4 V until the current reaches 0.05 C. Subsequently, fully discharge the battery at a current of 0.2 C and a current of 2 C separately to obtain a 0.2 C discharge capacity value and a 2 C discharge capacity value respectively. Obtain a 2 C discharge rate value by dividing the 2 C discharge capacity value by the 0.2 C discharge capacity value.

The test results are shown in Table 1, Table 2, and Table 3.

Low-Temperature Performance Test

Charge a battery at a current of 0.5 C in a (25±3) ° C. environment until the voltage reaches 4.4 V, and then charge the battery at a constant voltage of 4.4 V until the current reaches 0.05 C. Subsequently, discharge the battery at a current of 0.2 C under temperatures of 25° C. and −20° C. separately. Obtain a low-temperature discharge rate value by dividing the −20° C. discharge capacity value by the 25° C. discharge capacity value.

The test results are shown in Table 1, Table 2, and Table 3.

TABLE 1

| | Carbon nanotube bundle | | Second carbon nanotube | | Number (m) of carbon nanotube bundles | Fully-charged-state film resistance (R) | DCR (mΩ) | | Capacity retention rate | Charging time (min) | Rate | Low-temperature discharge rate |
|---|---|---|---|---|---|---|---|---|---|---|---|---|
| Example | Ingredient | Mass percent | Ingredient | Mass percent | | | Initial DCR | $500^{th}$-cycle DCR | | | | |
| Embodiment 1-1 | 1# | 0.50% | / | / | 6 | 0.23 | 55.9 | 67.8 | 86.9% | 44.8 | 87.9% | 68.8% |
| Embodiment 1-2 | 1# | 0.30% | / | / | 6 | 0.30 | 56.8 | 68.3 | 85.5% | 47.3 | 86.5% | 67.3% |
| Embodiment 1-3 | 1# | 0.30% | 1# | 0.50% | 6 | 0.25 | 52.0 | 64.9 | 91.1% | 45.0 | 92.3% | 73.5% |
| Embodiment 1-4 | 2# | 0.30% | 1# | 0.50% | 6 | 0.23 | 51.7 | 63.2 | 91.2% | 44.7 | 92.2% | 72.9% |
| Embodiment 1-5 | 3# | 0.30% | 1# | 0.50% | 6 | 0.19 | 51.4 | 62.7 | 90.9% | 44.9 | 92.5% | 73.0% |
| Embodiment 1-6 | 4# | 0.30% | 1# | 0.50% | 6 | 0.11 | 52.7 | 64.0 | 89.3% | 45.3 | 90.5% | 70.1% |
| Embodiment 1-7 | 5# | 0.30% | 1# | 0.50% | 6 | 0.28 | 51.7 | 60.1 | 91.7% | 44.2 | 91.7% | 73.0% |
| Embodiment 1-8 | 6# | 0.30% | 1# | 0.50% | 6 | 0.50 | 54.8 | 67.6 | 88.4% | 45.1 | 88.3% | 69.4% |
| Embodiment 1-9 | 7# | 0.30% | 1# | 0.50% | 6 | 0.27 | 50.1 | 63.9 | 91.3% | 44.1 | 92.0% | 73.3% |
| Embodiment 1-10 | 8# | 0.30% | 1# | 0.50% | 6 | 0.35 | 52.6 | 64.2 | 90.5% | 44.9 | 91.1% | 71.3% |
| Embodiment 1-11 | 9# | 0.30% | 1# | 0.50% | 6 | 0.30 | 52.8 | 63.0 | 90.9% | 44.6 | 90.8% | 71.0% |
| Embodiment 1-12 | 10# | 0.30% | 1# | 0.50% | 6 | 0.27 | 53.3 | 61.4 | 90.8% | 44.7 | 90.9% | 71.0% |
| Embodiment 1-13 | 11# | 0.30% | 1# | 0.50% | 6 | 0.16 | 51.3 | 57.6 | 91.9% | 44.3 | 91.7% | 72.9% |
| Embodiment 1-14 | 12# | 0.30% | 1# | 0.50% | 6 | 0.19 | 51.5 | 58.1 | 91.8% | 44.3 | 91.5% | 73.0% |
| Embodiment 1-15 | 13# | 0.30% | 1# | 0.50% | 6 | 0.21 | 51.9 | 58.4 | 92.0% | 44.5 | 91.7% | 72.7% |
| Embodiment 1-16 | 14# | 0.30% | 1# | 0.50% | 6 | 0.23 | 52.3 | 61.7 | 90.6% | 44.9 | 90.4% | 71.6% |
| Embodiment 1-17 | 15# | 0.30% | 1# | 0.50% | 6 | 0.27 | 52.5 | 61.9 | 90.5% | 44.6 | 90.1% | 71.9% |
| Embodiment 1-18 | 2# | 0.10% | 1# | 0.50% | 2 | 0.43 | 54.5 | 66.7 | 89.3% | 45.4 | 89.7% | 70.9% |
| Embodiment 1-19 | 2# | 0.40% | 1# | 0.50% | 10 | 0.22 | 51.5 | 63.0 | 90.5% | 45.0 | 92.5% | 72.9% |
| Embodiment 1-20 | 2# | 0.50% | 1# | 0.50% | 15 | 0.17 | 50.9 | 62.3 | 90.8% | 44.5 | 92.8% | 72.9% |
| Embodiment 1-21 | 2# | 0.80% | 1# | 0.50% | 22 | 0.13 | 50.3 | 61.5 | 90.4% | 44.3 | 92.6% | 72.6% |
| Embodiment 1-22 | 2# | 1.00% | 1# | 0.50% | 30 | 0.08 | 49.8 | 61.4 | 90.7% | 44.2 | 92.5% | 72.3% |
| Embodiment 1-23 | 2# | 1.10% | 1# | 0.50% | 32 | 0.08 | 49.9 | 62.3 | 90.1% | 44.9 | 91.7% | 71.9% |
| Embodiment 1-24 | 10# | 0.10% | 1# | 0.50% | 6 | 0.50 | 53.8 | 65.5 | 89.7% | 45.2 | 90.9% | 72.5% |
| Embodiment 1-25 | 7# | 0.50% | 1# | 0.50% | 6 | 0.16 | 51.2 | 64.0 | 91.5% | 44.9 | 92.5% | 72.9% |
| Embodiment 1-26 | 3# | 0.80% | 1# | 0.50% | 6 | 0.10 | 50.7 | 63.2 | 91.6% | 44.7 | 92.3% | 72.8% |
| Embodiment 1-27 | 1# | 0.05% | 1# | 0.50% | 1 | 0.7 | 55.9 | 75.5 | 88.5% | 46.1 | 89.7% | 69.1% |
| Embodiment 1-28 | 14# | 0.30% | 1# | 0.50% | 2 | 0.53 | 52.3 | 72.0 | 87.3% | 45.7 | 89.9% | 68.7% |

TABLE 2

| | Carbon nanotube bundle | | Second carbon nanotube | | Number (m) of carbon nanotube bundles | Fully-charged-state film resistance (R) | DCR (mΩ) | | Capacity retention rate | Charging time (min) | Rate | Low-temperature discharge rate |
|---|---|---|---|---|---|---|---|---|---|---|---|---|
| Example | Ingredient | Mass percent | Ingredient | Mass percent | | | Initial DCR | $500^{th}$-cycle DCR | | | | |
| Embodiment 2-1 | 1# | 0.30% | 1# | 0.8% | 6 | 0.25 | 52.0 | 64.9 | 91.1% | 45.0 | 92.3% | 72.5% |
| Embodiment 2-2 | 1# | 0.30% | 2# | 0.5% | 6 | 0.22 | 52.0 | 64.5 | 90.8% | 45.1 | 92.2% | 72.8% |
| Embodiment 2-3 | 1# | 0.30% | 3# | 0.5% | 6 | 0.38 | 52.9 | 65.7 | 90.3% | 45.1 | 90.9% | 71.3% |
| Embodiment 2-4 | 1# | 0.30% | 4# | 0.5% | 6 | 0.13 | 52.1 | 63.0 | 91.6% | 44.5 | 91.7% | 72.0% |
| Embodiment 2-5 | 1# | 0.30% | 5# | 0.5% | 6 | 0.46 | 52.9 | 65.6 | 90.3% | 45.3 | 91.2% | 71.4% |
| Embodiment 2-6 | 1# | 0.30% | 6# | 0.5% | 6 | 0.2 | 51.8 | 65.3 | 90.5% | 45.1 | 91.5% | 71.1% |
| Embodiment 2-7 | 1# | 0.30% | 7# | 0.5% | 6 | 0.28 | 52.3 | 64.7 | 91.5% | 44.7 | 91.8% | 72.1% |
| Embodiment 2-8 | 1# | 0.30% | 8# | 0.5% | 6 | 0.33 | 52.4 | 64.7 | 91.6% | 44.9 | 92.1% | 72.3% |
| Embodiment 2-9 | 1# | 0.30% | 9# | 0.5% | 6 | 0.39 | 52.6 | 65.0 | 91.2% | 44.9 | 92.2% | 72.0% |
| Embodiment 2-10 | 1# | 0.30% | 10# | 0.5% | 6 | 0.47 | 53.7 | 66.0 | 90.8% | 45.6 | 91.9% | 71.2% |
| Embodiment 2-11 | 1# | 0.30% | 1# | 0.2% | 6 | 0.42 | 54.2 | 66.1 | 91.0% | 45.7 | 91.9% | 72.1% |
| Embodiment 2-12 | 1# | 0.30% | 1# | 0.3% | 6 | 0.37 | 53.2 | 65.9 | 90.7% | 44.9 | 91.6% | 71.3% |
| Embodiment 2-12 | 1# | 0.30% | 1# | 1.0% | 6 | 0.15 | 51.2 | 63.9 | 91.2% | 44.9 | 91.6% | 71.3% |

TABLE 3

| | Carbon nanotube bundle | | Second carbon nanotube | | Number (m) of carbon nanotube bundles | Fully-charged-state film resistance (R) | DCR (mΩ) | | Capacity retention rate | Charging time (min) | Rate | Low-temperature discharge rate |
|---|---|---|---|---|---|---|---|---|---|---|---|---|
| Example | Ingredient | Mass percent | Ingredient | Mass percent | | | Initial DCR | $500^{th}$-cycle DCR | | | | |
| Comparative Embodiment 1 | / | / | 1# | 0.50% | 0 | 0.97 | 63.4 | 79.3 | 77.0% | 56.7 | 80.5% | 58.8% |

TABLE 3-continued

| Example | Carbon nanotube bundle | | Second carbon nanotube | | Number (m) of carbon nanotube bundles | Fully-charged-state film resistance (R) | DCR (mΩ) | | Capacity retention rate | Charging time (min) | Rate | Low-temperature discharge rate |
|---|---|---|---|---|---|---|---|---|---|---|---|---|
| | Ingredient | Mass percent | Ingredient | Mass percent | | | Initial DCR | $500^{th}$-cycle DCR | | | | |
| Comparative Embodiment 2 | D1 | 0.30% | / | / | 6 | 0.85 | 62.4 | 78.6 | 79.0% | 53.3 | 81.3% | 59.2% |
| Comparative Embodiment 3 | D1 | 0.30% | 1# | 0.50% | 6 | 0.57 | 61.7 | 77.1 | 80.0% | 51.7 | 82.0% | 60.2% |
| Comparative Embodiment 4 | D2 | 0.30% | 1# | 0.50% | 4 | 0.65 | 61.1 | 77.9 | 79.4% | 52.1 | 81.7% | 59.7% |

As can be seen from comparison between Table 1 and Comparative Embodiments 1 to 4, when the positive active material layer includes the carbon nanotube bundles and the length-to-diameter ratio of the carbon nanotube bundles is 2.5 to 100, the DCR, rate performance, and low-temperature performance of the battery are improved and the charging time is shortened in contrast to the battery containing no carbon nanotube bundles. In addition, when the battery contains the carbon nanotube bundles and the second carbon nanotubes and the parameters satisfy the specified conditions, the cycle life of the battery is improved. When R×m≤5, the battery achieves superior overall performance.

As can be seen from comparison between Embodiment 1-1, Embodiment 1-2, and Embodiment 1-3, when the battery contains the second carbon nanotubes, the DCR, rate performance, and low-temperature performance of the battery are improved and the charging time is shortened in contrast to the battery containing no second carbon nanotubes.

As can be seen from Embodiment 1-3 to Embodiment 1-17, when the average length, average tube diameter, and length-to-diameter ratio of the carbon nanotube bundles are set to fall within appropriate ranges, the battery achieves superior overall performance such as a low DCR, good rate performance, good low-temperature performance, and long cycle life.

As can be seen from Embodiment 1-18 to Embodiment 1-23, for the carbon nanotube bundles in an area of 20 μm×20 μm, when the number of carbon nanotube bundles is 2 to 30, the carbon nanotube bundles wrap the surface of the active material, the ion conductivity is high, the formed conductive network is relatively complete, and the overall performance of the battery is good.

As can be seen from Table 2, when the average length and average diameter of the second carbon nanotubes are set to fall within appropriate ranges, the overall performance of the battery is improved.

What is described above is merely preferred embodiments of this application, but not intended to limit the scope of this application. All types of variations and improvements made by a person of ordinary skill in the art without departing from the conception of this application still fall within the protection scope defined by the claims of this application.

What is claimed is:

1. A secondary battery, comprising: a positive electrode plate, wherein the positive electrode plate comprises a current collector and a positive active material layer; and the positive active material layer comprises a positive active material and a carbon material, wherein the carbon material comprises carbon nanotube bundles, a ratio of an average length of the carbon nanotube bundles to an average diameter of the carbon nanotube bundles is in a range of 2.5 to 100, wherein each carbon nanotube bundle comprises a plurality of first carbon nanotubes;

wherein a diameter of each first carbon nanotube is 15 nm to 40 nm;

a fully-charged-state film resistance of the positive electrode plate is R Ω, and a number of carbon nanotube bundles within an area of 20 μm×20 μm of an SEM image is m;

$$R \times m \leq 5; \text{ and}$$

$$0\ \Omega < R \leq 0.5\ \Omega.$$

2. The secondary battery according to claim 1, wherein the carbon nanotube bundles satisfy at least one of the following conditions:

(i) an average length of the carbon nanotube bundles is 2 μm to 10 μm; and (ii) an average bundle diameter of the carbon nanotube bundles is 0.01 μm to 2 μm.

3. The secondary battery according to claim 1, wherein a number of carbon nanotube bundles within an area of 20 μm×20 μm of an SEM image is m, and 2≤m≤30.

4. The secondary battery according to claim 1, wherein an average number of first carbon nanotubes in each carbon nanotube bundle is n, and 50≤n≤10000.

5. The secondary battery according to claim 1, wherein based on a total mass of the positive active material layer, a mass percent of the carbon material is 0.1% to 1%.

6. The secondary battery according to claim 1, wherein the carbon material further comprises second carbon nanotubes, and the second carbon nanotubes are provided on a surface of a particle of the positive active material and a surface of the carbon nanotube bundles.

7. The secondary battery according to claim 6, wherein the second carbon nanotubes satisfy at least one of the following conditions:

(a) an average length of the second carbon nanotubes is 0.1 μm to 2 μm; and (b) an average diameter of the second carbon nanotubes is 3 nm to 40 nm.

8. The secondary battery according to claim 6, wherein based on a total mass of the positive active material layer, a mass percent of the carbon nanotube bundles is 0.1% to 1%; and/or a mass percent of the second carbon nanotubes is 0.1% to 1%.

9. The secondary battery according to claim 6, wherein based on a total mass of the positive active material layer, a mass percent of the carbon nanotube bundles is less than a mass percent of the second carbon nanotubes.

10. An electronic device, comprising: a secondary battery, the secondary battery comprising a positive electrode plate, wherein the positive electrode plate comprises a current collector and a positive active material layer; and the positive active material layer comprises a positive active material and a carbon material, wherein the carbon material comprises carbon nanotube bundles, a ratio of an average length of the carbon nanotube bundles to an average diameter of the carbon nanotube bundles is in a range of 2.5 to 100, wherein a carbon nanotube bundle comprises a plurality of first carbon nanotubes;

wherein a diameter of each first carbon nanotube is 15 nm to 40 nm;

a fully-charged-state film resistance of the positive electrode plate is R Ω, and a number of carbon nanotube bundles within an area of 20 μm×20 μm of an SEM image is m;

$$R \times m \leq 5; \text{ and}$$

$$0\ \Omega < R \leq 0.5\ \Omega.$$

11. The electronic device according to claim 10, wherein the carbon nanotube bundles satisfy at least one of the following conditions:

(i) an average length of the carbon nanotube bundles is 2 μm to 10 μm; and (ii) an average bundle diameter of the carbon nanotube bundles is 0.01 μm to 2 μm.

12. The electronic device according to claim 10, wherein a number of carbon nanotube bundles within an area of 20 μm×20 μm of an SEM image is m, and $2 \leq m \leq 30$.

13. The electronic device according to claim 10, wherein an average number of the first carbon nanotubes in each carbon nanotube bundle is n, and $50 \leq n \leq 10000$.

14. The electronic device according to claim 10, wherein based on a total mass of the positive active material layer, a mass percent of the carbon material is 0.1% to 1%.

15. The electronic device according to claim 10, wherein the carbon material further comprises second carbon nanotubes, and the second carbon nanotubes exist on a surface of a particle of the positive active material and a surface of the carbon nanotube bundles.

16. The electronic device according to claim 15, wherein the second carbon nanotubes satisfy at least one of the following conditions:

(a) an average length of the second carbon nanotubes is 0.1 μm to 2 μm; and (b) an average diameter of the second carbon nanotubes is 3 nm to 40 nm.

17. The electronic device according to claim 15, wherein a mass percent of the carbon nanotube bundles is 0.1% to 1%; and/or a mass percent of the second carbon nanotubes is 0.1% to 1% based on a total mass of the positive active material layer.

18. The electronic device according to claim 15, wherein a mass percent of the carbon nanotube bundles is less than a mass percent of the second carbon nanotubes based on a total mass of the positive active material layer.

* * * * *